(12) United States Patent
Gilbert

(10) Patent No.: US 6,922,937 B1
(45) Date of Patent: Aug. 2, 2005

(54) BAITFISH LURE

(76) Inventor: Mitchell A. Gilbert, P.O. Box 3511, Mesquite, NV (US) 89024

( * ) Notice: Subject to any disclaimer, the term of this patent is extended or adjusted under 35 U.S.C. 154(b) by 5 days.

(21) Appl. No.: 10/604,217

(22) Filed: Jul. 1, 2003

Related U.S. Application Data

(62) Division of application No. 09/721,150, filed on Nov. 22, 2000, now Pat. No. 6,588,138.

(51) Int. Cl.$^7$ .......................... A01K 85/18; A01K 97/02
(52) U.S. Cl. ...................................... 43/42.06; 43/44.99
(58) Field of Search ............................. 43/42.06, 44.99

(56) References Cited

U.S. PATENT DOCUMENTS

| | | | |
|---|---|---|---|
| 2,004,308 A | 6/1935 | Catarau | 43/42 |
| 2,008,004 A * | 7/1935 | Catarau | 43/42.06 |
| 2,302,206 A | 11/1942 | Gibson | 43/41 |
| 2,749,647 A | 6/1956 | Beloff | 43/42.06 |
| 2,752,721 A | 7/1956 | Denny | 43/42.33 |
| 2,937,467 A | 5/1960 | Capps | 43/42.06 |
| 3,205,608 A | 9/1965 | Dickinson | 43/42.23 |
| 3,654,724 A | 4/1972 | Charron | 43/42.06 |
| 3,688,430 A * | 9/1972 | Balch | 43/42.06 |
| 3,708,903 A * | 1/1973 | Bercz et al. | 43/17.6 |
| 3,748,772 A | 7/1973 | Gravitt | 43/41 |
| 3,757,455 A * | 9/1973 | Strader | 43/42.14 |
| 3,844,060 A | 10/1974 | Kurachi | 43/41 |
| 4,044,490 A * | 8/1977 | Young et al. | 43/42.06 |
| 4,047,317 A | 9/1977 | Pfister | 43/42.06 |
| 4,163,339 A | 8/1979 | Worden | 43/44.4 |
| 4,176,490 A | 12/1979 | Philips | 43/42.15 |
| 4,205,476 A | 6/1980 | Hsu | 43/42.06 |
| 4,553,348 A | 11/1985 | Cooper | 43/42.06 |
| 4,640,042 A * | 2/1987 | Rowe | 43/42.15 |
| 4,839,982 A | 6/1989 | Wood | 43/41 |
| 4,848,023 A | 7/1989 | Ryder et al. | 43/44.2 |
| 4,873,782 A | 10/1989 | Gudermuth, Jr. | 43/42.15 |
| 5,117,575 A | 6/1992 | Desmond | 43/44.08 |
| 5,218,780 A | 6/1993 | Jacobson | 43/44.4 |
| 5,319,875 A | 6/1994 | Brandolino | 43/42.06 |
| 5,377,442 A | 1/1995 | Gariglio | 43/44.4 |
| 5,617,669 A | 4/1997 | Levey | 43/44.99 |
| 5,829,186 A | 11/1998 | Schultz et al. | 43/44.6 |
| 6,079,145 A * | 6/2000 | Barringer | 43/42.06 |

* cited by examiner

Primary Examiner—Teri Pham Luu
Assistant Examiner—Bret Hayes
(74) Attorney, Agent, or Firm—Kenehan & Lambertsen, Ltd.; John C. Lambertsen

(57) ABSTRACT

A fishing lure consisting of an arched hollow body with an interior bait chamber is provided. The interior chamber is divided into a buoyancy chamber and a bait chamber. A number of small openings are formed in the outer body to enable scent and bait particles to be broadcast from bait stored within the bait chamber as the lure is passed through the water. Access to the bait chamber is further provided by either a hinged cover or by a hinged connection formed in the lure body between the buoyancy chamber and the bait chamber. Access to the bait chamber is restricted while the lure is being passed through the water as a result of the water flow positioning either the cover or the hinged lure body over the opening to the bait chamber. Once removed from the water, access to the bait chamber is readily obtained through movement of either the cover or the hinged lure body for re-supplying bait prior to supplemental use of the lure.

6 Claims, 2 Drawing Sheets

BAITFISH LURE

CROSS REFERENCE TO RELATED APPLICATIONS

This application is a divisional of application Ser. No. 09/721,150, filed Nov. 22, 2000, (scheduled to issue as U.S. Pat. No. 6,588,138 on Jul. 8, 2003).

BACKGROUND OF INVENTION

1. Field of the Invention

The present invention relates to fishing lures, and more particularly, to artificial fishing lures. More specifically, the present invention relates to artificial fishing lures that include a storage chamber within the lure to retain chum material in a manner that exposes the material to the water in which the lure is immersed, to enhance the ability of the lure to attract fish.

2. Description of the Prior Art

MGIL.02P Patent1 Catching fish on a line has always involved the art of pretense, beginning with the attachment of the first stone gorge to a fishing line, circa 10,000 BC. In fact, many fishermen consider lures, the manner by which such deception is accomplished, to be the more fascinating aspect of sport fishing. These fishermen give much thought to the fabrication, selection, and manner of employment of fish lures.

The thousands of artificial lures lining the shelves of tackle stores would seem to overwhelm any thoughts toward the use of "live" bait. In the 90's, using "live" bait to catch fish seems almost an anachronism something out of a Norman Rockwell painting. In fact, nothing could be further from the truth. While lures and flies may be effective fish catchers, live baits frequently take more translating into more fun on the water.

In an attempt to have the best of both worlds, certain artificial lures have included structures that are intended to retain and disburse a scent that is intended to resemble smaller fish, insects or other natural fish foods. For example, a lure is constructed in U.S. Pat. No. 4,047,317 to Pfister out of two shells, creating an intermediate chamber that is intended to retain any one of various types of scent producing material, such as blood, fish oil, artificial scent and chopped fish parts. When a liquid is used, a piece of felt or sponge is saturated with the liquid, and then placed within the chamber.

When employing the strategy of scent enhancement, it is vital that the lure enable the "broadcast" of the scent. U.S. Pat. No. 5,377,442 to Gariglio shows a bait rigging system with the bait attached to a hook. This complete access to open water also risks the entire loss of bait, should an unhook event occur. U.S. Pat. No. 5,218,780 to Jacobsen illustrates a coil spring mechanism that wraps around the bait to reduce the risk of unhooked bait. However, the bait in Jacobsen remains only partially surrounded, and the battering forces inherent in casting and trolling place the bait at risk of removal. U.S. Pat. No. 5,117,575 to Desmond provides still another structure for exposing the bait to the flow of water, risking dislodgment and loss of the bait.

In U.S. Pat. No. 4,839,982 to Wood, a bag having open mesh sides is provided, enhancing the securement of the bait. The bag is slidably mounted on the leader, but does not provide the movement obtained through a lure, which can simulate the movement of a minnow or other small baitfish.

U.S. Pat. No. 4,163,339 to Worden provides a lure having a loop of line to encircle the bait. U.S. Pat. No. 4,848,023 to Ryder makes use of a cover for a small fish. Only the head is enclosed within the cover, exposing the body and tail of the fish to the potentially dislodging effects of the water. U.S. Pat. No. 3,748,772 to Gravit provides more or less "complete" protection, where a live minnow (or other small fish) is placed within a transparent bubble. With no water exchange possible, any attraction that is provided by the minnow must be entirely of a visual nature.

If the best attributes of live bait are to be obtained within the more convenience of artificial lures, a need exists for retaining a scented material within the body of the lure for its preservation, while permitting exposure of the scented material to the water through which the lure is passed.

SUMMARY OF INVENTION

It is an object of the present invention to provide an artificial fishing lure that is simple in construction and that permits insertion of the bait within the lure body to enable the continued natural movement of the lure even after insertion of the bait.

Constructed out of a hard plastic material, the durable lure body permits the dispersal of small particles of bait over a period of time, eliminating the requirement for the constant application of bait to the lure. Additionally, the manner of its insertion permits different types of bait to be used within the lure, including roe, cheese, cut bait, and fish attractant placed on a piece of cotton or other absorbent material.

A still further object of the present invention is to provide easy access to the bait-holding compartment within the lure, utilizing an unsecured, hinged connection. The slip-stream effect of the moving lure results in the access opening to the bait-holding compartment remaining substantially closed as the lure is moved through the water during use.

In this regard, a lure known as the Helin FLATFISH® is modified by forming two separated, front and rear inner compartments. In one case the lure body is physically divided by an intermediate hinged connection, and in the other, an inner partition wall within the lure forms the two compartments.

Apertures are provided in the outer wall of the aft, second compartment, which are intended to permit the unimpaired flow of water into and out of the second compartment during passage of the lure through water. The arched shape of the FLATFISH® lure results in a wobbling action as the lure is drawn through the water. Such wobbling causes particles of bait within the compartment to loosen and escape through the apertures, providing a chumming effect to further enhance the attractiveness of this lure.

In one case an unsecured outer lid provides access to the interior of the second compartment, permitting the placement of bait therein. Alternatively, in another preferred embodiment, a hinged connection secures the two halves of the lure, and access to the interior of the aft, second compartment for bait loading is obtained by opening the hinged connection. In both cases, no additional restraints are utilized, such that either lifting the cover or rotating about the hinged connection easily obtains access to the inner bait compartment.

Some further objects and advantages of the present invention shall become apparent from the ensuing description and as illustrated in the accompanying drawings.

DETAILED DESCRIPTION

Figure 1:
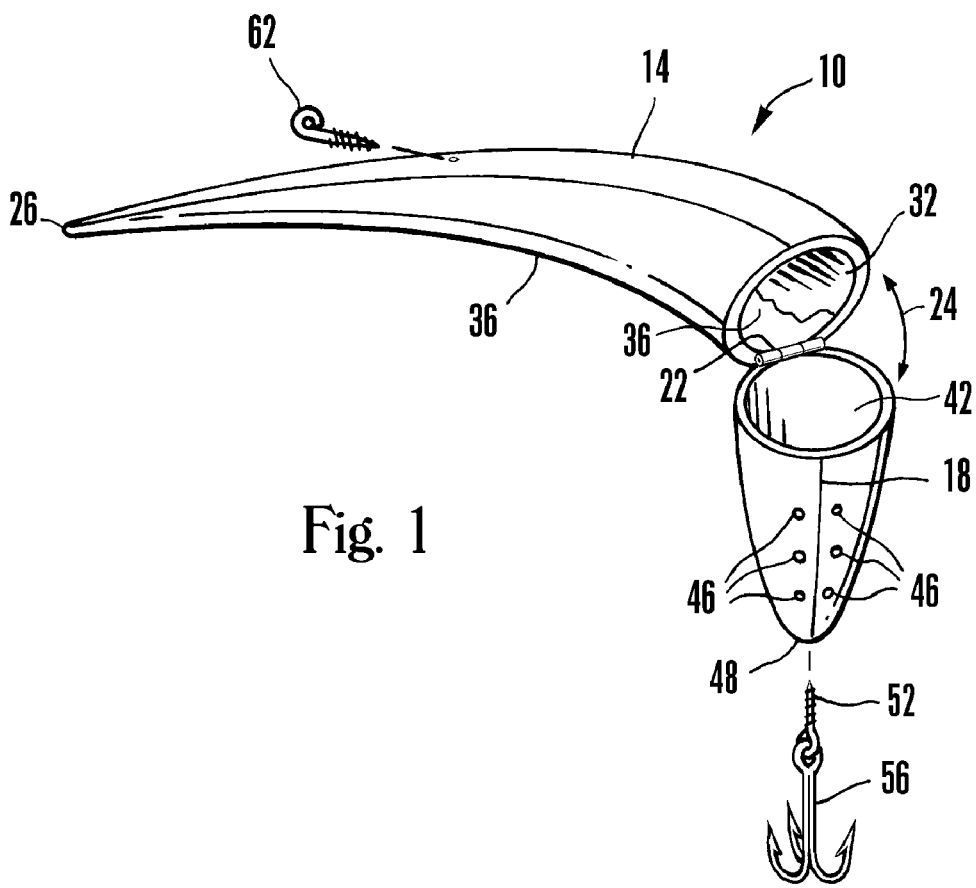
FIG. 1 is a partially exploded perspective view showing a fishing lure in accordance with the present invention.

Reference is now made to the drawings, wherein like numerals refer to like parts throughout. In FIG. 1 a fishing lure 10 of a conventional FLATFISH® design is modified in a manner forming a front or head section 14 and an aft section 18 that are attached to one another by a hinge 22, forming a hinged opening 24. Utilization of the hinge 22 enables the articulation of the front section 14 and the aft section 18 between an open and a closed position (FIG. 1 illustrates the "open" position).

The front section 14 narrows to a leading tip 26, enhancing its ability to move in a generally linear manner as it is pulled through water. At its connection with the hinge 22, the front section 14 has broadened to form an interior buoyancy chamber 32 that is closed off by an end cap 36. It has been the interaction between shape and buoyancy, and the resulting "live action" wiggling movement that has made this type of lure so popular with fishermen.

There is no similar closure over the aft section 18, resulting in the formation of an inner bait chamber 42. A plurality of scent apertures 46 are formed in an outer surface of the aft section 18, permitting fluid communication between the bait chamber 42 and the environment surrounding the fishing lure 10. The scent apertures 46 enable passage of water into and from the bait chamber 42 while the fishing lure 10 is in the water, permitting the dispersal of scent and, in some instances, particles of the bait material (not shown in the Figures) placed within the bait chamber 42 into the surrounding water to further attract fish.

The aft section 18 also narrows towards a trailing tip 48, which forms an attachment point for fishhook-mounting hardware, such as a hook eye screw 52. A treble hook 56 is shown attached to the hook eye screw 52 in FIG. 1, although other types of hooks are certainly acceptable as falling within the scope of the present invention.

The interplay between the buoyancy chamber 32 and the shape of the front section 14 provides a mechanism to regulate the depth of the fishing lure 10 as it passes through the water. A leader eye screw 62 is attached to the front section 14 at a location that is determined by the desired trolling depth. Placement of the leader eye screw 62 at a location closer to the leading tip 26 results in a smaller angle of attack of the front section 14 relative to the water, and a higher trolling level relative to the water surface.

Figure 2:
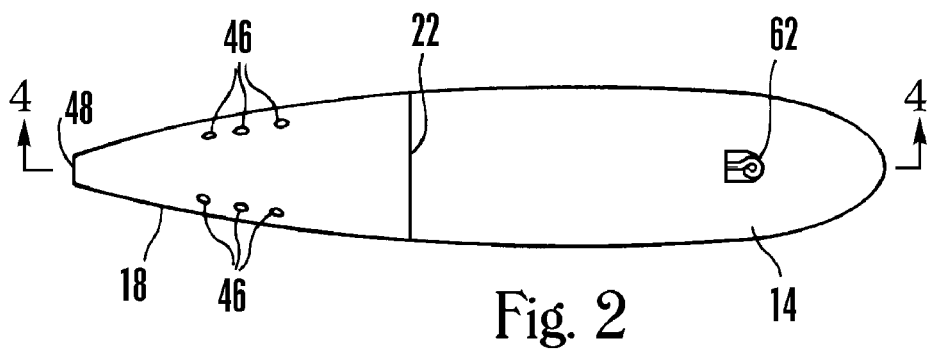
FIG. 2 is a top plan view of a fishing lure in accordance with the present invention.
Figure 3:
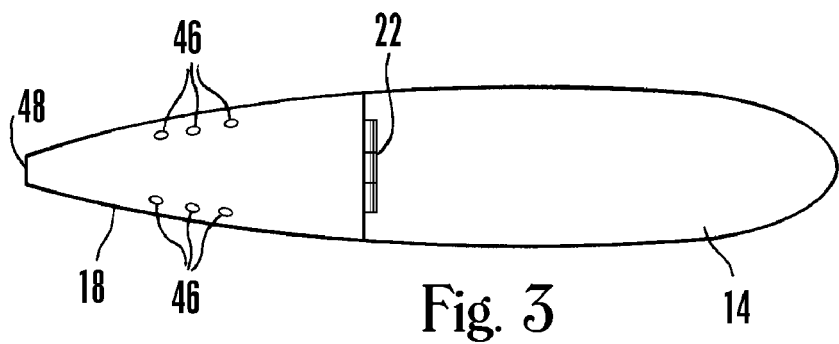
FIG. 3 is a bottom plan view of a fishing lure in accordance with the present invention.

In FIGS. 2 and 3 the fishing lure 10 is shown with the hinged opening 24 in a "closed" position. As depicted therein, the plurality of scent apertures 46 are preferably located both dorsally and ventrally on the fishing lure 10. As so located, maximum dispersal of any scented material contained within the bait chamber 42 (not shown in FIGS. 2 and 3) is achieved as the fishing lure 10 is passed through the water.

Figure 4:
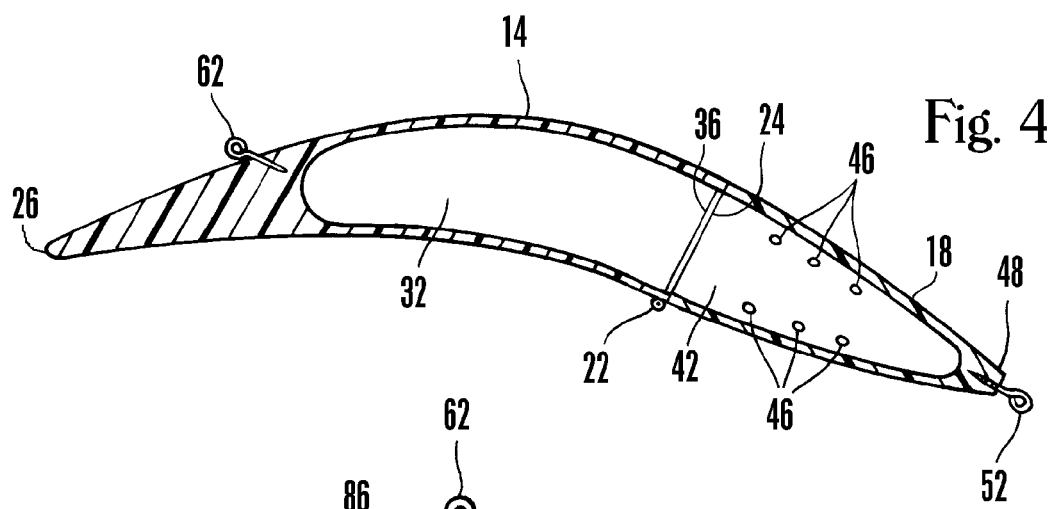
FIG. 4 is a cross-sectional view of the fishing lure of FIG. 1 in accordance with the present invention.

FIG. 4 shows the placement and relative dimensions of the buoyancy chamber 32 and the bait chamber 42 within the fishing lure 10. As sealed by the end cap 36, the air within the buoyancy chamber 32 is an essential part of the fishing lure 10. As it is moved through the water, this trapped air and the outer shape of the fishing lure 10 create the wiggling movement meant to attract interest from the game fish. Movement through the water also maintains the hinged opening 24 in the relatively "closed" position illustrated in FIG. 4.

Figure 6:
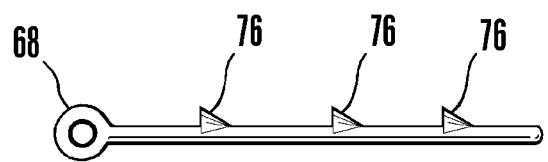
FIG. 6 is a partial side elevation view showing attachment cleats formed on a portion of the hinge mechanism of FIG. 5.

By eliminating any latching mechanism for the hinged opening 24, a greater degree of reliance is placed upon the hinge 22 and its manner of attachment to the fishing lure 10. A pair of extended support flanges 68 are received within the body of the fishing lure 10, one on either side of the hinged opening 24. A hinge pin 72 is received within the two hinge pieces, holding them together and forming a pivot, all in a conventional manner. To further anchor the hinge 22 within the fishing lure 10, a plurality of retention cleats 76 are formed on each of the extended support flanges 68. The retention cleats 76 resist the forced withdrawal of the support flanges 68 from within the body of the fishing lure 10 should a force, such as a hooked fish (not shown in the Figures) be applied. An additional view of the retention cleats 76 is also provided in FIG. 6.

Figure 7:
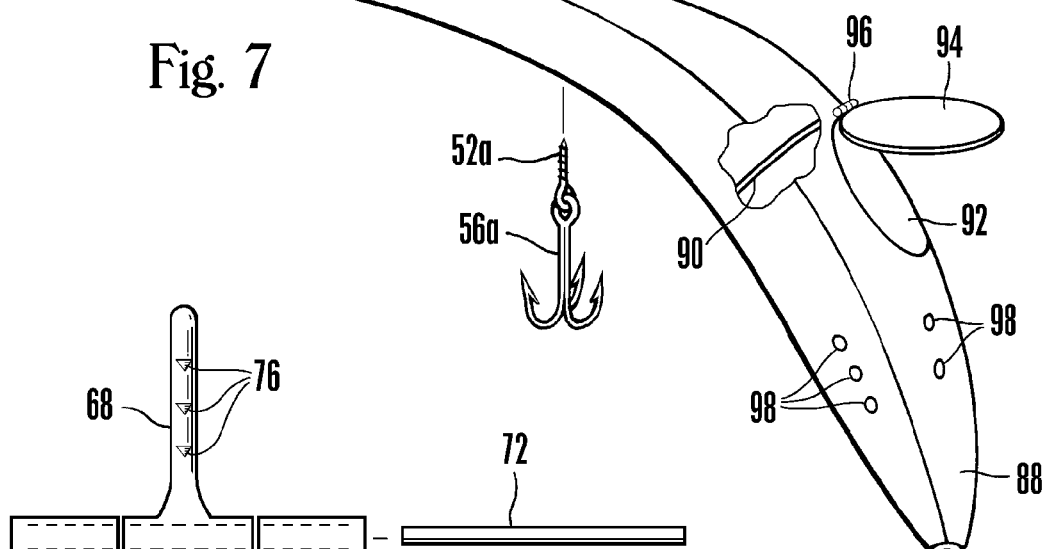
FIG. 7 is a partially exploded perspective view showing a fishing lure having an alternative bait compartment access design in accordance with the present invention.
Figure 5:
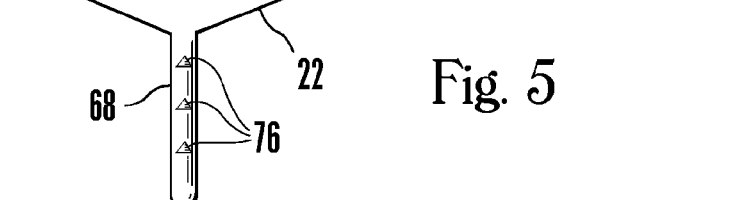
FIG. 5 is a partially exploded plan view, with portions in phantom, showing a hinge mechanism for use with the fish lure of the present invention.

A presently preferred alternative embodiment is shown in FIG. 7, wherein a modified lure 82 is internally divided into a front section 86 and an aft section 88 by an intermediately located plug 90. The front section 86 is filled with air for buoyancy, and the aft section forms a bait-receiving compartment 92. A cover 94 provides access to the bait-receiving compartment 92, with a cover hinge 96 enabling the opening and closing of the cover 94 between an open (only shown as "open" in FIG. 7).

As is the case with the fishing lure 10 previously discussed in the context of FIGS. 1–6, the modified lure 82 is provided with a plurality of scent apertures 98 formed in the aft section 88. These scent apertures 98 permit fluid communication between the interior of the bait-receiving compartment 92 and the environment through which the modified lure 82 is passed.

In this manner such scents as are emanated from any scented material located in the bait-receiving compartment 92 are broadcast to the surrounding water environment in the hopes of attracting additional fish to the area. Also, where desired, an additional treble hook 56a and another eyelet 52a can be located mid-lure, as is shown in FIG. 7. Some sportfish are quite specific in their attack behavior, and different hook locations can take advantage of such characteristics.

The fishing lure of the present invention is preferably fabricated out of a plastic material, preferably one that is hard with good wear characteristics. While the overall dimensions of the lure can vary (depending upon such factors as the type of fish being sought and the fishing location), for the majority of circumstances such lures are four inches in length and have a maximum thickness of 1½ inches in the mid-portion of the lure. Such lures as are sold under the FLATFISH® trademark by the Yakima Bait Co. of Granger, Wash., illustrate the generally acceptable outer dimensions for the fishing lures contemplated under the present invention.

When utilizing a lure of length four inches, the hinged opening is appropriately located 2½ inches from the leading tip. At that location the cross-section of the lure is substantially circular, and the end cap has a diameter of approximately 1⅜ inches. The aft section extends about 1½ inches from the hinged opening to the trailing tip, and (in a presently preferred embodiment) is provided with twelve (12) scent apertures of ⅛-inch diameter.

With only the hinge retaining the aft section to the front section, to avoid separation after a fist strike requires that the hinge be solidly anchored in both sections. In a presently preferred embodiment, this is accomplished by utilizing support flanges that extend up to ¾ inches into the opposing sections. Additionally, retention cleats extending approximately 1/16 inches above the surrounding surface of the support flanges further resist the extraction of the flanges during use.

The modified lure is typically of similar dimension as that previously discussed, with an outer cover of ¾ inches in diameter providing access to the bait-receiving compartment. Like its previously discussed companion lure, the cover of the modified lure is not secured, to assist in the bait loading process. Any such securement mechanisms make loading considerably more complicated, a situation made worse for the fisherman by the always present hooks that are ready to puncture and errant move while placing the bait within the lure.

My invention is disclosed in terms of a preferred embodiment thereof, which provides a baitfishing lure that is of great novelty and utility. Various changes, modifications, uses, and alterations in the teachings of the present invention may be contemplated by those skilled in the art without departing from the intended spirit and scope thereof. It is intended that the present invention encompass such changes and modifications.

What is claimed is:

1. A fishing lure comprising:
   a longitudinally extending outer body having an unrestrained hinged opening formed therein, said outer body defining an interior chamber that extends throughout a substantial portion of said outer body;
   a plug located within said interior chamber and attached to an inner wall thereof about an entire periphery of said plug in a manner forming a sealed relationship between said plug and said inner wall, thereby defining a first interior chamber and a second interior chamber, said second interior chamber in fluid communication with said unrestrained hinged opening of said outer body.

2. A fishing lure according to claim 1, wherein said outer body has a plurality of apertures formed therein, each of said plurality of apertures in fluid communication with said second interior chamber.

3. A fishing lure according to claim 2, wherein said unrestrained hinged opening further comprises a cover attached to said outer body by an unrestrained hinge, said cover overlying an opening formed in said outer body and in communication with said second interior chamber.

4. A fishing lure according to claim 2, wherein said outer body is divided into a front section and an aft section, with said first interior chamber within said front section and said second interior chamber within said aft section.

5. A fishing lure according to claim 4, and further comprising a hinge attached to and extending between both said front section and said aft section, providing a hinged connection relative thereto.

6. A fishing lure according to claim 5, wherein said plug is located adjacent said hinge, sealing said first interior chamber relative to said hinged connection, and wherein said hinge and said second interior chamber comprise said unrestrained hinged opening.

* * * * *